(12) United States Patent
Dunstan et al.

(10) Patent No.: US 7,143,215 B2
(45) Date of Patent: Nov. 28, 2006

(54) COMMUNICATING WITH DEVICES OVER A BUS AND NEGOTIATING THE TRANSFER RATE OVER THE SAME

(75) Inventors: Robert Dunstan, Forest Grove, OR (US); Dale Stolitzka, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 715 days.

(21) Appl. No.: 10/266,500

(22) Filed: Oct. 7, 2002

(65) Prior Publication Data

US 2004/0049616 A1 Mar. 11, 2004

Related U.S. Application Data

(63) Continuation of application No. 09/132,844, filed on Aug. 12, 1998, now Pat. No. 6,532,506.

(51) Int. Cl.
| | |
|---|---|
| *G06F 13/42* | (2006.01) |
| *G06F 13/40* | (2006.01) |
| *G06F 13/00* | (2006.01) |
| *G06F 3/00* | (2006.01) |
| *G06F 5/06* | (2006.01) |
| *G06F 13/20* | (2006.01) |
| *G06F 13/36* | (2006.01) |

(52) U.S. Cl. ........................ 710/104; 710/60; 710/106; 710/110

(58) Field of Classification Search ...................... None
See application file for complete search history.

(56) References Cited

U.S. PATENT DOCUMENTS 3,854,103 A 12/1974 Takarada
4,677,308 A * 6/1987 Wroblewski et al. ........ 340/459
4,719,458 A 1/1988 Miesterfeld et al.
4,899,338 A 2/1990 Wroblewski
4,920,532 A * 4/1990 Wroblewski ................. 370/276
4,965,550 A 10/1990 Wroblewski
5,237,676 A * 8/1993 Arimilli et al. ............. 710/110
5,559,967 A * 9/1996 Oprescu et al. ............. 710/105
5,761,533 A * 6/1998 Aldereguia et al. ........... 710/25
5,812,004 A 9/1998 Little
5,978,927 A * 11/1999 Curry et al. ................. 713/502
6,038,623 A * 3/2000 Schutte ....................... 710/100
6,112,275 A 8/2000 Curry et al.
6,477,171 B1 * 11/2002 Wakeley et al. ............. 370/404
6,532,506 B1 * 3/2003 Dunstan et al. ............. 710/100
6,539,443 B1 * 3/2003 Dunstan et al. ............. 710/106
6,842,808 B1 * 1/2005 Weigl et al. ................. 710/117

OTHER PUBLICATIONS

John Uffenbeck, "Microcomputers and Microprocessors, The 8080, 8085, and Z-80 Programming, Interfacing & Troubleshooting", Copyright 1985 by Prentice-Hall, Inc., Englewood Cliffs, NJ 07632, pp. 153-155.
William Stallin, "Data and Computer Communication", second edition, pp. 100-101.

* cited by examiner

*Primary Examiner*—Paul R. Myers
*Assistant Examiner*—Ryan Stiglic
(74) *Attorney, Agent, or Firm*—Blakely, Sokoloff, Taylor & Zafman LLP

(57) ABSTRACT

A system having a first device and a second device coupled to a single wire bus is described. The second device is operable to receive power from the single wire bus that is due to the first device driving the bus. The second device also communicates with the first device using the single wire bus.

23 Claims, 10 Drawing Sheets

US 7,143,215 B2

COMMUNICATING WITH DEVICES OVER A BUS AND NEGOTIATING THE TRANSFER RATE OVER THE SAME

This application is a Continuation of prior application Ser. No. 09/132,844, filed on Aug. 12, 1998, now U.S. Pat. No. 6,532,506.

FIELD OF THE INVENTION

The present invention relates to the field of communication between devices in a computer system; more particularly, the present invention relates to the use of a positive logic single wire bus for communication between devices (e.g., a host and a battery) and to bus speed negotiation schemes usable with one-wire or multi-wire buses.

BACKGROUND OF THE INVENTION

Data buses are found in virtually all computers and computer-based products, serving to interconnect a computer's central processing unit to RAM, for example, or to enable communications between a microprocessor and an application-specific integrated circuit (ASIC), and/or to peripheral devices such as an intelligent battery or a display. Some of these data buses are single wire buses. Today, single wire buses that support communication between multiple devices use a wired-or technique. Typically, the bus is held high by a pull-up resistor or other current source. When a device wishes to use the bus for communication, the bus is actually driven low. Single wire buses are usually used to either transfer data between devices or send a clock signal. One limitation of these buses is that devices on a single wire bus do not obtain power from the bus while using the bus for communication.

Low-cost, battery-powered products such as cellular phones or handheld computers typically employ a one-wire data bus, with all bus communications conducted at a single, fixed bus speed. One such bus, produced by Dallas Semiconductor Corp. of Dallas, Tex. and described in the product data sheets for their DS1820 "1-WIRE" Digital Thermometer (DS1820 data sheet, pp. 9, 16–19, and 24–26 (Mar. 5, 1998)), is a one-wire data bus that is held at a logic "high" with a pull-up resistor when idle, and is actively pulled-down to a logic "low" state with a current source. As a result, the bus consumes power when conveying a logic "low" state or when switching, which may be undesirable in battery-powered products. The bus also operates at a fixed speed, dictated by the bus' AC Electrical Characteristics table (DS1820 Data Sheets, p. 25). Devices that are incapable of operating at the specified speed will not communicate properly over the bus.

Another one-wire data bus is produced by Benchmarq Microelectronics, Inc. of Dallas, Tex. and is described in the data sheet for their bq2018 "POWER MINDER" IC (bq2018 data sheet, pp. 6 and 10–13 (September 1997)). This bus also has a dictated, fixed speed, with no method of changing bus speed to accommodate a variety of device communication speeds or a changing configuration of devices, greatly limiting the variety of devices that can be connected to the bus.

The communication speed capabilities of devices designed to communicate over a data bus vary widely. It is also often desirable to alter the configuration of the devices connected to a data bus. Neither of these factors are satisfactorily accommodated by the fixed speed one-wire data buses presently available.

Although there are a number of single wire buses, each have one or more limitations when being used to communicate with low-end devices such as batteries. Thus, a need exists for a single wire bus that overcomes the limitations of the prior art buses. Also, there is a need for a bus negotiation scheme that is operable over a one-wire data bus, which automatically adjusts the bus speed to accommodate the communication capabilities of all the devices coupled to the bus at any one time.

SUMMARY OF THE INVENTION

A system having a first device and a second device coupled to a positive logic single wire bus is described. The second device is operable to receive power from the single wire bus that is due to the first device driving the bus. The second device also communicates with the first device using the single wire bus.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A single wire positive logic bus is described. In the following description, numerous details are set forth, such the number of clock phases, voltage magnitudes, etc. It will be apparent, however, to one skilled in the art, that the present invention may be practiced without these specific details. In other instances, well-known structures and devices are shown in block diagram form, rather than in detail, in order to avoid obscuring the present invention.

Overview

A single-wire communication bus is described that communicates information between devices coupled to the bus. The bus may be coupled in a point-to-point arrangement with a master-slave relationship between devices on the bus. One or more of the devices may operate as a slave and one or more devices may operate as a master. In one embodiment, the bus comprises a relatively low-speed (e.g., 1 to 10 KHz), inexpensive-to-implement or emulate single wire bus that allows multi-mastering. The bus may also supply power to a device to wake it up or to temporarily power the interface of a device. In one embodiment, the bus may supply power to any device coupled to the bus.

In one embodiment of a system, a master communicates with a slave over the single wire bus. The master may comprise a host, a central processing unit (CPU) or other processor, a controller or management unit, or any device that communicates with a slave device. In one embodiment, the master may comprise a controller (e.g., keyboard controller) or a system management unit that turns devices, units or subsystems, such as for instance, power planes on a motherboard, on and off. The slave may comprise a client, a battery (or battery subsystem), power-related devices, or other devices (e.g., contrast control, backlight control, charger, power supply, etc.).

To communicate bits of data, the master drives the single wire bus to the slave device high. The slave device uses the rising edge of the driven bus as a clock, i.e. the rising edge represents the beginning of a clock cycle. In such a system, the master and slave operate with an underlying expectation of timing. An arrangement that does not require such an underlying expectation of timing is described below with reference to a bus speed negotiation scheme.

Figure 1:
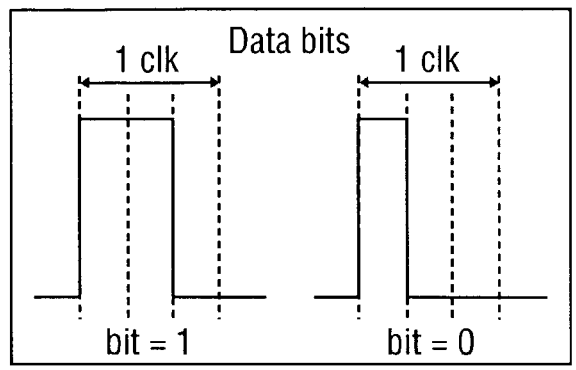
FIG. 1 is a timing diagram illustrating one embodiment of a logical level definition.

For master to slave communications, a timing relationship is established. In one embodiment, if the bus remains high longer than a threshold period of time, the slave device interprets the signal as a logic one; if the bus goes low before the threshold period of time, the device interprets the signal as a logic zero. An example of the timing for the master to signal a logic 1 and a logic 0 is shown in FIG. 1 where a 1 bit comprises a logic high on the bus for ⅔ of a clock cycle (i.e., two clock phases) and a 0 bit comprises a logic high on the bus for only ⅓ of a clock cycle (i.e., one clock phase) and a logic low on the bus for the next ⅔ of the clock cycle, where the clock cycle is divided into three equal clock phases. Note that having the first phase of the clock bus high allows energy to be obtained from the clock, irrespective of the logic states being driven on the bus.

In one embodiment, the first low-to-high edge in a message is not a clock pulse, but a wake-up pulse. This embodiment is discussed in greater detail below.

The data protocol given above is only one example and many others are possible. For instance, the clock cycle may be divided into more than three clock phases (e.g., four clock phases, etc.). However, the use of three clock phases allows for a simple integer-arithmetic microcontroller code implementation that is used by a device coupled to the single wire bus. In another embodiment, the clock phases need not be equal in size. For instance, while three phases may be advantageous when it comes to perspective of bus bandwidth utilization, four phases may be more advantageous from a microcontroller implementation perspective.

For the slave to signal data, the slave device pulls down the bus after the threshold period to signal a logic low (zero) to the master or leaves the bus high to signal a logic high (one) to the master. In the case of the convention described above, the slave device pulls down the bus during the second of the three phases or maintains the second phase high. In an alternate embodiment, this convention may be reversed so that pulling down the bus corresponds to the assertion of a logic high and maintaining the bus high corresponds to a logic low.

Thus, in one embodiment, the single wire bus comprises a positive logic bus, i.e. a bus that is high when it is asserted, independent of the logic level that is being driven on the bus. It should be noted that the master(s) and slave(s) will use a predetermined protocol, such as the one described above, to determine the logic levels the master or slave is asserting on the bus.

Timing

Figure 2:
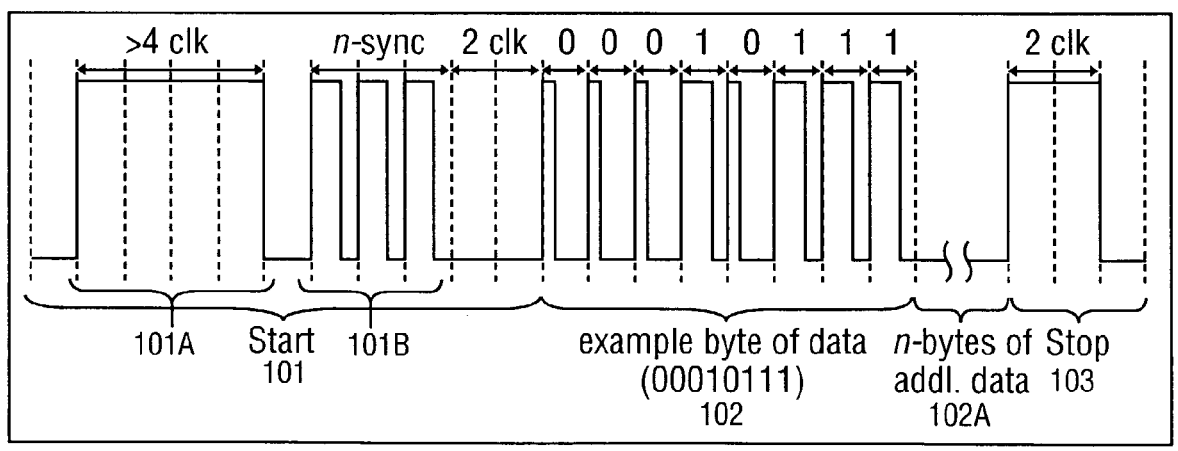
FIG. 2 is a timing diagram illustrating communication on a single wire bus.

FIG. 2 is a timing diagram illustrating activity on the single wire bus. The timing of activity on the bus typically includes a start period, a message transfer period, and a stop period. Referring to FIG. 2, if a device (e.g., a master) wishes to use the bus after the bus has been idle, the device drives the bus high followed by a series of short pulses on the bus as shown in start period 101. The device drives the bus high for a predetermined number of microseconds to wake-up and source power to devices on the bus. This high period is shown as wakeup pulse 101A. The positive logic bus may also used by a slave device to power itself (or a portion of its interface). The impedance (primarily resistive) of the bus is low enough to allow a device to draw current from the bus. This current can be used to wake up the device and optionally power its communication interface or some other portion of the device.

The number and size of the pulse(s) to wake-up and power devices on the bus is predetermined and is selected arbitrarily based on factors such as, for instance, the amount of power desired from the pulses that is needed to wake up or turn on the interface of one or more device. In one embodiment, the device drives the bus high for 4 clock cycles.

The wake up/power up pulse(s) is followed by a series of N synchronization pulses 101B. The number of synchronization pulses is a design choice depending on factors such as noise level, component fidelity, etc. Start period 101 ends with the device pulling the bus low for 2 clock cycles. In one embodiment, the device drives the bus low for a duration of 50 and 100 microseconds In one embodiment, the width of the pulses in start period 101 is shorter than the width of a data pulse on the bus (i.e., shorter than the threshold time period) to ensure devices on the bus are reset instead of driving the bus. Note that one or all of slave devices may be able to be powered by the single wire communication bus.

After start period 101, when the devices on the bus are powered up (e.g., after start period 101), a master on the bus drives the bus high for a period of time. In one embodiment, this period of time is 1 clock phase and is equal to one-third of a clock cycle. In one embodiment, this first time period may be five microseconds. As described above, the rising edge of the pulse signals the start of a bit. Following this first time period, either the master (or another master) or a slave will pull the bus down or maintain the bus high for a time period to signal a logic zero or a logic one, respectively. In one embodiment, the second time period comprises a second phase of the clock cycle following the first phase of the clock cycle and is equal to one-third of the clock cycle. In one embodiment, the second time period may comprise 5 microseconds. Following the second time period, there is an intra bit time represented by a third time period. The third time period comprises a third phase of the clock cycle following the first and second phases of the clock cycle and is equal to one-third of the clock cycle.

An example of use of the logic level convention described above is shown in FIG. 2 with an example byte of data 102. In FIG. 2, there may be one or more additional bytes of data 102a. Thus, the entire data block is a stream of a predetermined number of bits or bytes. The number of bytes may be predetermined or identified in a length byte, depending on the higher level protocol employed. The data unit may be bits, bytes, words, or any identifiable grouping.

The data is followed by the master driving the bus high for a predetermined number of clocks (e.g., two clocks) and then low for a predetermined number of clocks (e.g., one clock) to signal stop period 103. Then the bus returns to the idle state. The bus may return to idle if it is low for a predetermined period of time. In one embodiment, this period of time may be between 1× and 2× bit-period defined in the current message.

In one embodiment, an optional protocol abort may be included. A physical level transaction may be optionally aborted if eight 1's (0xff) are received within a one-byte boundary. Use of this requirement would preclude data at decimal 65535 and firmware downloads with blank code space. Unwritten code space would be required to contain 0's, for example. In one embodiment, an abort may also occur when the first phase timing (e.g., the high time) is violated after start period 101 has been passed.

Collision Avoidance and Resolution

In one embodiment, multiple devices can be coupled to the single wire bus at the same time. Therefore, collision detection and resolution requires any device that is placing data on the bus, master or slave, to read back the values they placed on the bus. If a device drives the bus high, but reads back the bus low, then they have detected a collision with another device and they discontinue any bus activity. For instance, if at least one device asserts a one (maintains the line high) and another device asserts a zero (pulls the line low), the device that asserts the zero is allowed to continue and the other device(s) surrenders ownership of the bus.

For instance, with respect to collision avoidance, each master monitors the activity on the bus and if a master sees a transaction on the bus, that master does not drive the bus. Masters take steps to resolve collisions as well. If a master believes that the bus is not busy after monitoring the bus and not seeing any transactions, the master drives the bus high to obtain ownership of the bus, which comprises the wake-up pulse 101A of FIG. 2. If multiple masters drive the bus the same way at the same time, each master will not be aware that a collision has occurred because they will both be under the impression that the information they read back from the bus is the information they drove on the bus. The masters monitor each bit that is driven and any time a master sees a low on the bus when it has driven the bus high, indicating that a collision has occurred, that master drops off the bus. The master dropping off the bus, in effect, relinquishes ownership of the bus to the other master(s). Note that up to this point, since the masters have all been driving bits onto the bus the same way, no incorrect data has been driven or received by any one particular device. This same collision resolution is used by the masters into the message transfer period and the stop period.

Slave devices are typically addressed. Therefore, slave devices monitoring the bus for their address may determine whether the data on the bus is directed toward them. However, if multiple slaves are selected at the same time, and both are reading the bus, the slaves monitor what information they have driven on the bus and determine whether there is a conflict. This dictates how resolution will occur. For instance, if a master sends out a logic one asking for data from the slave as part of a read operation, the first phase of the clock will be driven high. During the second phase, the slave may leave the bus high to assert a logic one or pull it low to assert a logic zero. If a first slave leaves the bus high, while the second slave pulls the bus low, the first slave on observing that the bus is low drops off the bus. Note that if both the slaves are providing the same value, it does not matter whether either one drops off the bus since both are driving correct data. In other words, both devices continue to drive the bus until there is a collision because the information transferred prior to the collision is the same.

System Overview

Figure 6:
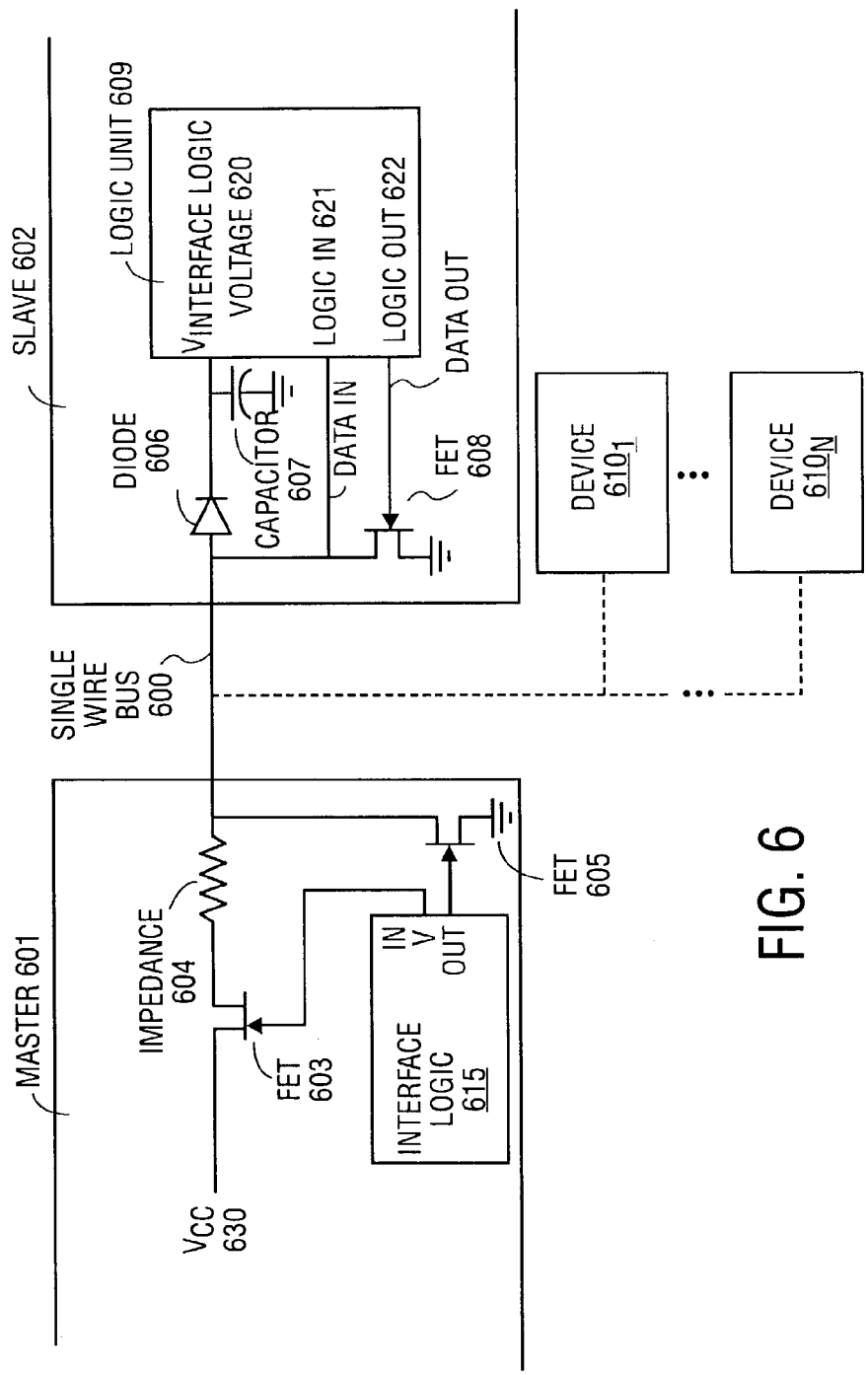
FIG. 6 is a block diagram of one embodiment of a system.

FIG. 6 is a block diagram of one embodiment of a system having a single wire bus 600 coupling a master 601, and a slave device 602. The system may optionally include other devices coupled to single wire bus 600, such as for example devices $610_1$–$610_N$. These devices may be slave devices or master devices or a combination of both.

Slave device 602 comprises a logic unit 609. The bus interface comprises diode 606, capacitor 607 and field effect transistor (FET) 608 to interface single wire bus 600 to logic unit 609. Diode 606 is coupled to single wire bus 600 and a voltage input 620 of logic 609 for supplying voltage for the interface logic. One terminal of capacitor 607 is coupled to diode 606 and the voltage input 620 of logic unit 609, while the other terminal of capacitor 607 is grounded. As slave device 602 receives pulses driven by master 601 during the start period, capacitor 607 charges. Capacitor 607 has a time constant selected based on the impedance of single wire bus 600 to result in a drive current from the voltage on capacitor 607 minus the voltage drop over diode 606. When capacitor 607 is charged to over a threshold value sufficient to power the logic circuit, voltage is supplied to logic unit 609 at voltage input 620 to wake it up or to power its interface logic (or to power some portion of its functionality needing power) Note that in some embodiments, the voltage received over single wire bus 600 may be sufficient to power the entire slave device 602. In other embodiments, the voltage need only be enough to enable logic unit 609 to cause slave device 602 to be powered up, whether it be by logic unit 609 powering up slave device 602 or by triggering another unit, logic, or circuitry to supply such power. For instance, in the case of a battery, the voltage received may only need to be enough to trigger a FET or other switching device to trigger the battery core to supply power to the remainder of slave device 602 so that slave device 602 may be powered by power stored in its own battery cells.

Slave device 602 also includes a signal path, logic in 621, from single wire bus 600 for receiving data at a logic input of logic unit 609. Slave device 602 also sends data via a logic output, logic out 622, of logic unit 609. If logic unit 609 is going to pull down single wire bus 600 in order to, for example, drive a logic zero on single wire bus 600, a logic high is driven at the logic out 622 to FET 608, which is coupled between single wire bus 600 and ground. If a logic one is to be driven onto single wire bus 600, logic unit 609 drives the logic out 622 low. Note that when slave device 602 drives data onto single wire bus 600, a voltage may appear at the voltage input 620 to continue to power the interface or to power some other portion of logic unit 609. In alternate embodiments, a bipolar transistor or any other "open-collector equivalent" device, or switch, may be used. Note that any of devices 603, 605 and 608 can be replaced with a relay or any device that may be turned on or off.

Figure 7:
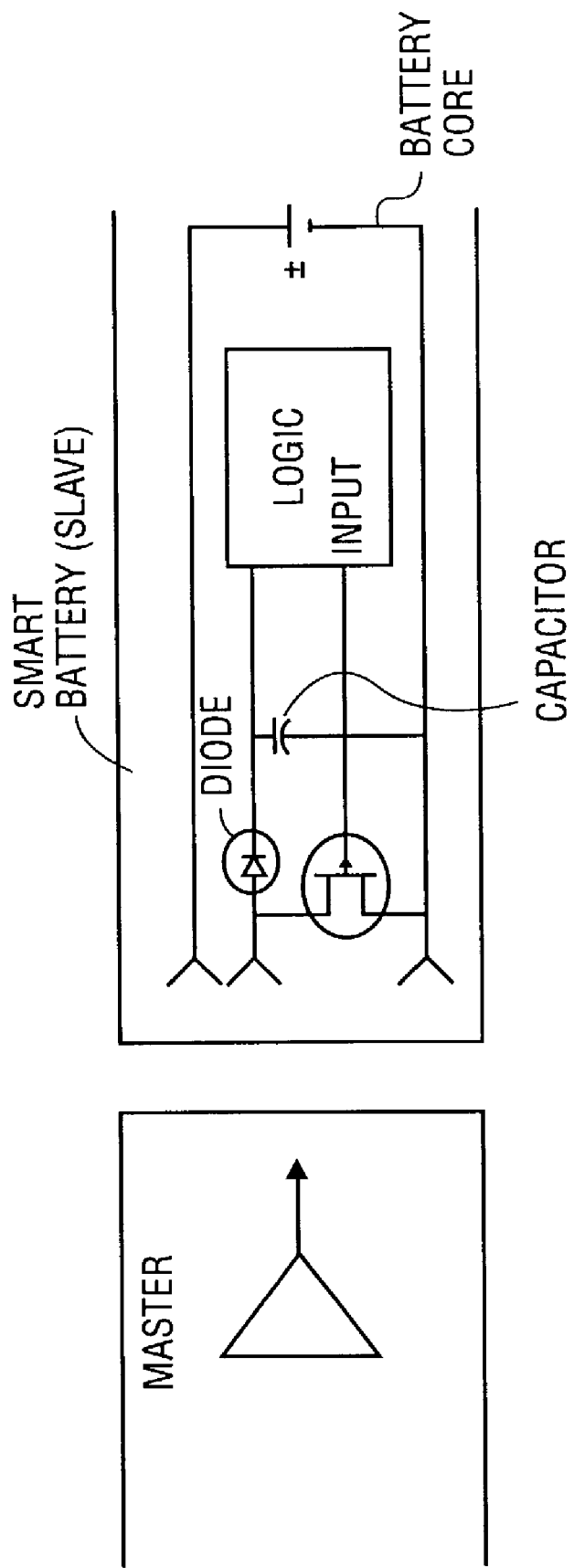
FIG. 7 illustrates one embodiment of a battery.

Although a slave device is shown being able to receive data and drive data to single wire bus 600, other embodiments of a slave device may only have one or the other. Furthermore, slave device 601 may have other terminals (for inputs and outputs) for data or other purposes. For instance, a slave device may include positive and negative terminals if it were a battery. An implementation of a such a slave device is shown in FIG. 7 where the slave device only includes a data input, but also includes positive and negative terminals.

Figure 3:
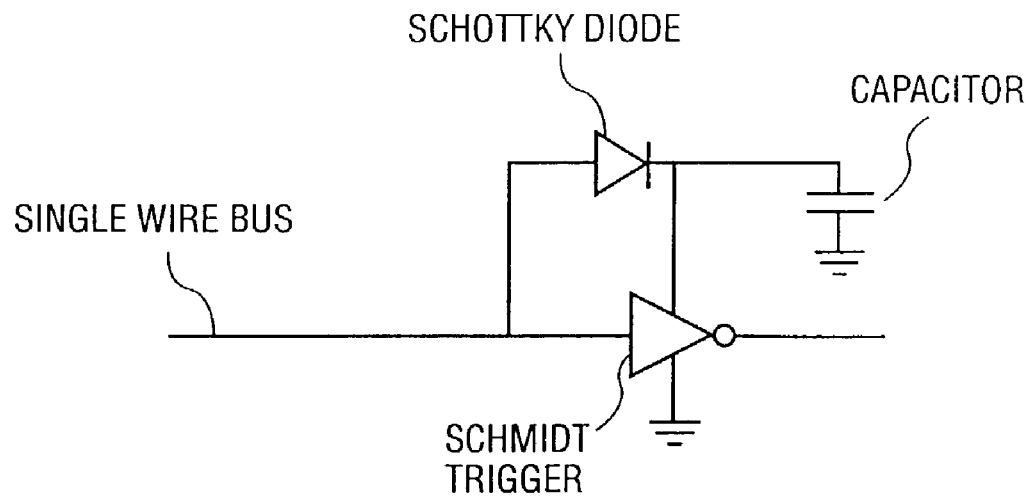
FIG. 3 is an exemplary interface that is powered by the single wire bus.

Another embodiment of a slave interface that is powered by the signal line is shown in FIG. 3. Referring to FIG. 3, the interface has a Schottky diode and a capacitor are used to power a Schmidt Trigger input device. A field effect transistor (FET) (or another similarly functioning device) could be used instead of a diode to enable another power source.

Figure 4:
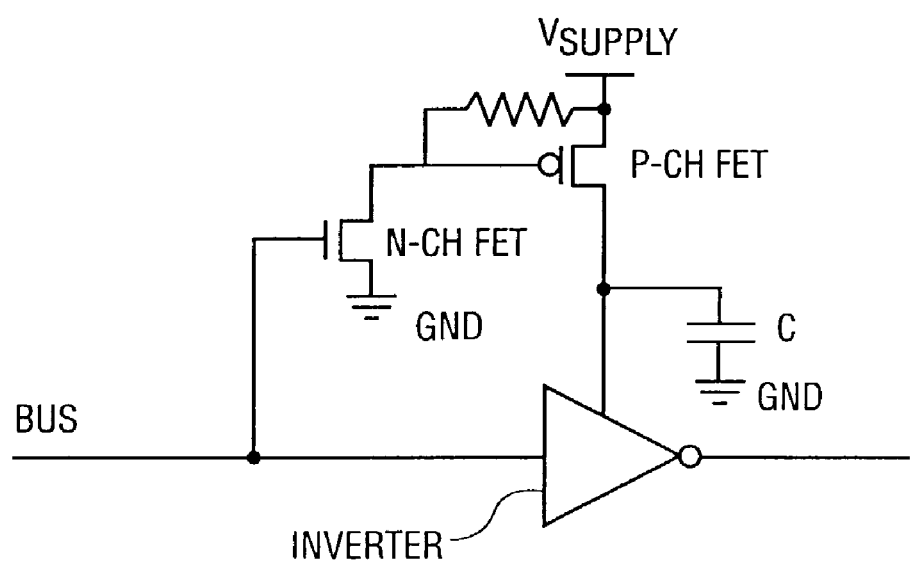
FIG. 4 is another embodiment of an interface that is powered by the single wire bus.

FIG. 4 illustrates an alternate embodiment of a slave interface. Referring to FIG. 4, an n-channel FET having a gate connected to the bus and having its source grounded and its drain tied to the gate of a p-channel FET. The p-channel FET has its drain tied to a supply pin of an inventor (e.g., Schmidt trigger) and the positive plate of a charge retention capacitor. The source of the p-channel FET is connected to a voltage supply. A high ohm path (e.g., 1 mega-ohm or so) across the p-channel FET from its source to its gate. The negative plate of the capacitor is grounded. The n-channel FET is off when the bus is low and on when the bus is high. Whenever the n-channel FET is on, the p-channel FET also conducts because its gate is pulled to ground. The capacitor maintains operating voltage at the supply pin of the inventor while the power circuit is off for a period of time. In such a case, a logic 1 would turn on the FET (or another device), which has a lower voltage drop.

When the slave is a battery (or battery subsystem) the battery will be powering a master and the master will be receiving the power from the battery to communicate with the battery. The battery doesn't have to power a portion of its electronic (e.g., interface electronics) and the remainder of the system when the battery is not being used. Using the single wire bus, the battery interface electronics may be awakened. This allows for lowering the power budget in the battery. Although devices have been described herein that are powered or receive power as a result of one or more pulses driven on the bus, one or more devices may be powered always or in such a manner that no powering of the device(s) is needed from the bus.

Referring back to FIG. 6, a master 601 is shown using a voltage source Vcc 630, such as a 5 volts source, to drive single wire bus 600 through FET 603, which acts as a switch, and impedance 604. In one embodiment, impedance 604 may be primarily resistive, and may include a 1 Kohm resistor. In an embodiment where a Vcc (voltage source 630) is a five volt source and impedance 604 is a 1 Kohm resistor, a five volt signal will be driven on to single wire bus 600. In such a case, the voltage at voltage input 620 of slave device 602 would be 4.6 volts (assuming a 0.4 volt drop across the Schottky diode). In an alternate embodiment, a current source (e.g., 5 ma source) may be used in place of the voltage source 630.

Master device 601 includes interface circuitry 615 that receives information from bus 600 on one input and drives information onto bus 600 through an output via FET 605. This is particularly important in implementing a multi-master system, where a master looks at the bus to see if another device is driving the bus. When holding the bus high, if a master reads a logic low on the bus, the master knows that there is another master driving the bus. Interface logic 615 also generates a signal to control FET 603.

Master 601 (e.g., host) and slave device 602 may include other functionality which has not been shown to avoid obscuring the invention. For instance, a device may include other functioning units to perform dedicated or general purpose functions, other circuitry or logic, and may even include memory.

Establishing Bus Speed

The single wire bus may also specify the bus speed used to transmit information between devices.

A data bus system and bus speed negotiation method are presented that automatically negotiate bus speed between the devices coupled to the bus, enabling the bus to handle devices which communicate at different speeds, and to accommodate the addition and/or deletion of devices to and from the bus.

A message originating device (e.g., master) is coupled to a message receiving device (e.g., slave) via a single data bus wire. The terms "message originating device" and "message receiving device" will be used in the following discussion instead of master and slave, respectively, to avoid limiting the applicability of the bus speed negotiation schemes described herein to master-slave systems. It should be noted that other portions of this disclosure may not be limited to master-slave systems.

Prior to conveying a message to the receiving device, the originating device places a first bus negotiation logic pulse onto the bus. In response, the receiving device places a second bus negotiation logic pulse onto the bus, the pulse width of which is representative of the device's speed capabilities. Both devices measure the elapsed time between the start of the first pulse and the end of the first pulse or the second pulse, whichever occurs last. This elapsed time is used to define the bus speed for a message to be conveyed between the two devices.

The bus negotiation scheme is well-suited to a bus which automatically accommodates a changing array of devices connected to it. Bus negotiation is performed prior to the conveyance of each message. Thus, devices can be physically removed or added to the bus, or electrically enabled or disabled, at any time when the bus is idle, and an appropriate bus speed is negotiated before the next message is sent. All the message receiving devices coupled to the bus at a given time respond to a master's bus negotiation pulse, and all the bus devices measure the elapsed time defined above. The responsive pulses of slower receiving devices have longer pulse widths, which lengthen the elapsed time defined above. This technique determines the speed capabilities of the slowest receiving device on the bus, which is used to define a common bus speed for all active bus devices. In this way, the bus is made to automatically accommodate a wide variety of bus devices, whether a high speed device that employs an ASIC, for example, or a low speed device such as an intelligent battery that employs a low-speed microcontroller.

The data bus system and method is applicable to a number of data bus classes, including one host-one client (Class 1), one host-multiple clients, none of which can initiate messages (Class 2), and one host-multiple clients, some of which can initiate messages (Class 3). In one embodiment, the data bus system only consumes power when switching and negotiating bus speed, thereby consuming less power than prior art buses.

Figure 8:
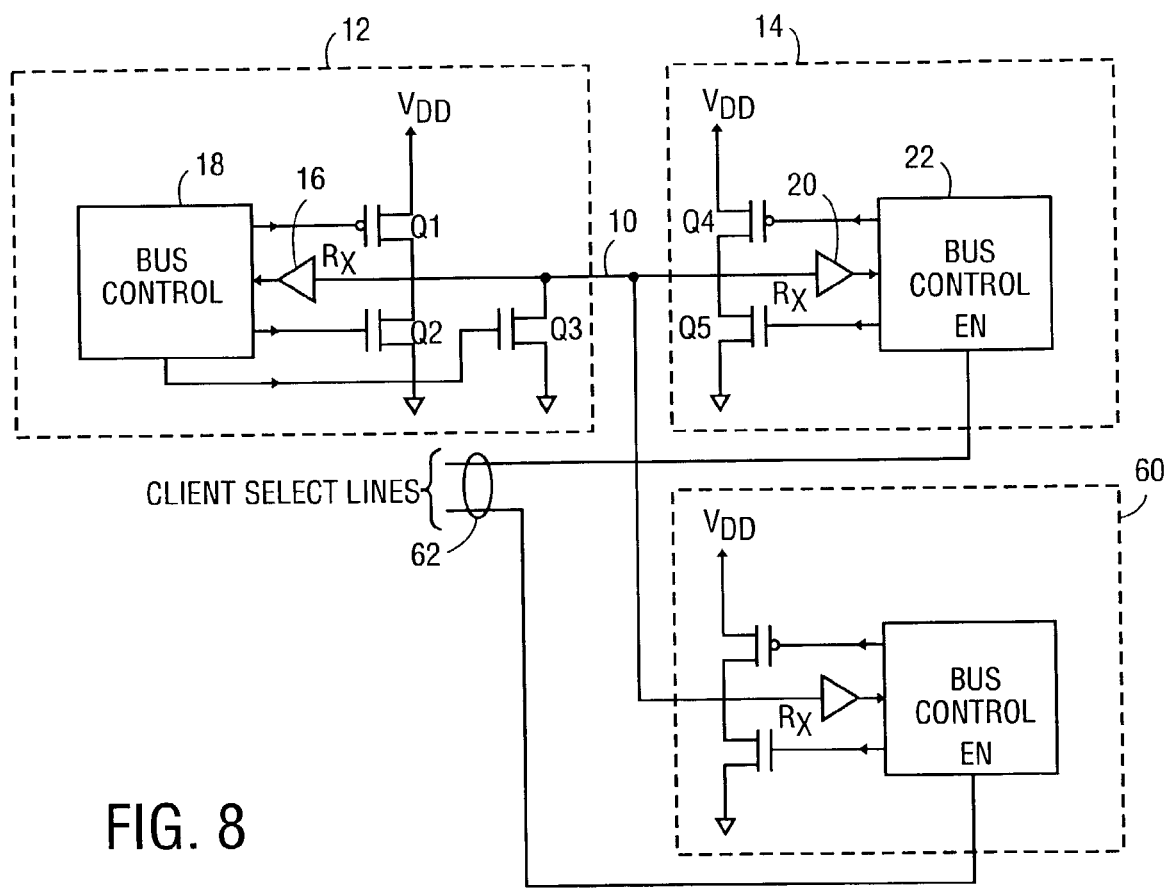
FIG. 8 is a combination block and schematic diagram of a Class 1 data bus system which includes a bus speed negotiation described herein.

A data bus system which includes a bus speed negotiation scheme which automatically establishes a common bus speed for all devices on the bus is shown in FIG. 8. A data bus wire 10 ("the bus") interconnects a message originating device 12 and a message receiving device 14. The originating device 12 preferably drives the bus with two transistors Q1 and Q2, arranged such that turning on Q1 drives the bus to a logic "high" or "1" state, while turning on Q2 pulls the bus down to a logic "low" or "0" state. Originating device 12 also includes a receiver 16 coupled to the bus, which senses the bus' logic state and conveys it to a bus control circuit 18. Bus control circuit 18 is also coupled to the control inputs of Q1 and Q2, and produces the signals needed to turn these transistors on and off as necessary. A third transistor Q3 is also coupled to pull down on the bus; Q3's function is described below.

The receiving device 14 also includes two transistors Q4 and Q5 which drive the bus in the same manner as Q1 and Q2, respectively, and a receiver 20 for sensing the state of the bus. A bus control circuit 22 receives the output of receiver 20 as an input, and outputs control signals to turn transistors Q4 and Q5 on and off as needed.

The data bus carries messages from one device to another, with the content of the messages conveyed as a series of data bits. Each data bit is allotted a particular window of time in which to convey its logic state ("1" or "0"); that window of time is referred to herein as a "bit time". The bus speed is directly related to the bit time: a short bit time provides a faster bus speed that permits more bits to be conveyed in a given period, while a longer bit time reduces the bus speed, and thereby the amount of data that can be conveyed during the same time period. The prior art one-wire buses discussed above operated at a fixed bus speed, and thus had a fixed bit time.

Figure 9A:
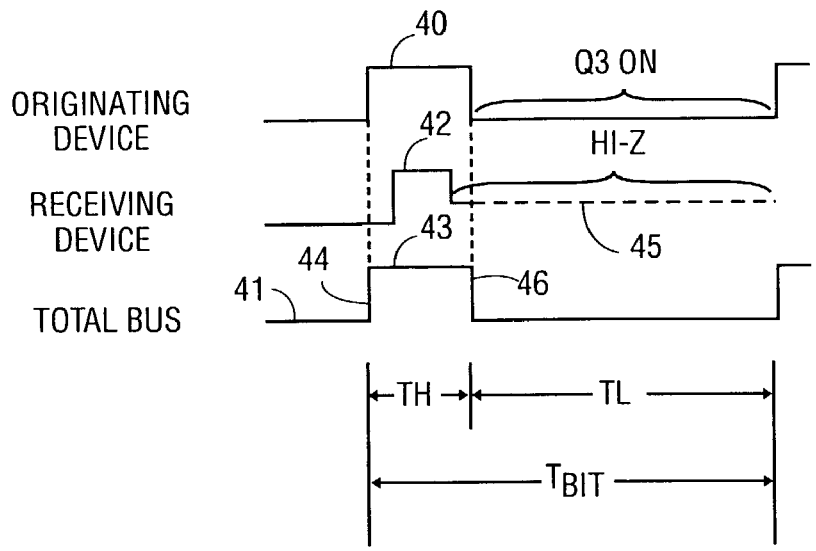
FIG. 9a is a timing diagram for the data bus system of FIG. 8, illustrating bus speed negotiation between a message originating device and a fast message receiving device.
Figure 9B:
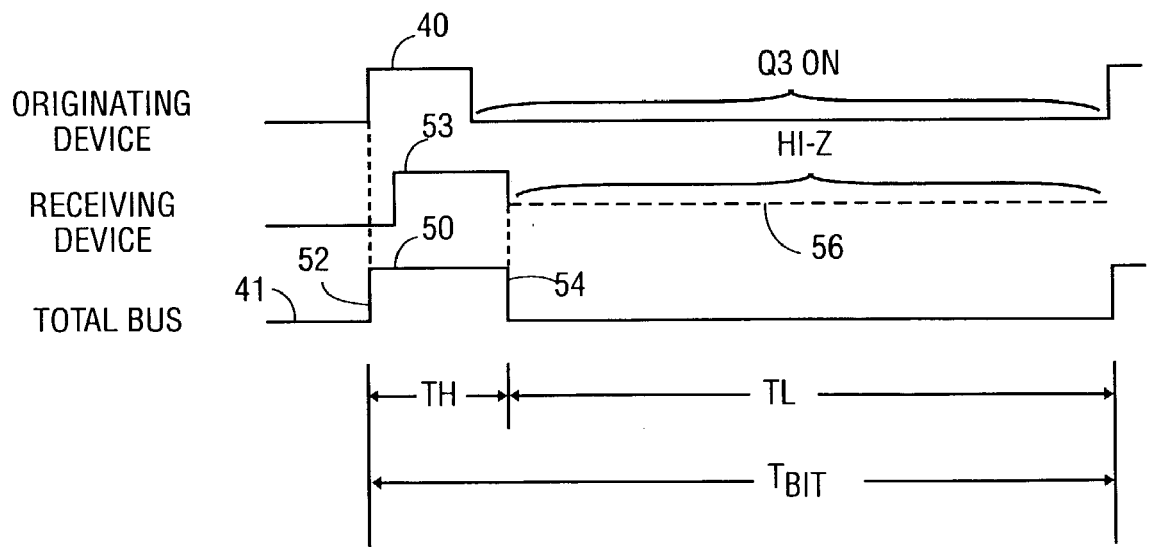
FIG. 9b is a timing diagram for the data bus system of FIG. 8, illustrating bus speed negotiation between a message originating device and a slow message receiving device.

The data bus system described herein provides for a variable bit time, with the bit time for a given message established just prior to its conveyance, based on the communication capabilities of all the bus devices that are both coupled to the bus and enabled to receive the upcoming message. A timing diagram illustrating the basic bus speed negotiation scheme is shown in FIGS. 9a and 9b. In FIG. 9a, the message originating device 12 places a logic pulse 40 onto the bus 10. Pulse 40 is toggled from a low to a high logic state by turning on transistor Q1, which, as reflected in TOTAL BUS waveform 41 shown in FIG. 9a, causes bus wire 10 to toggle to a logic high state. The receiver 20 in message receiving device 14 senses the occurrence of pulse 40, and responds by placing a logic pulse 42 onto the bus 10.

The pulse widths of pulses 40 and 42 represent the bus speeds proposed by their respective pulse generating devices (originating device 12 and receiving device 14, respectively). The bus speed that is established between devices 12 and 14 will be the slower of the two proposed speeds as indicated by their respective pulses 40 and 42. Adopting the slower speed insures that both devices are capable of reading a message conveyed between them.

To determine the bus speed that is to be adopted, both originating device 12 and receiving device 14 measure the elapsed time between the "start" of pulse 40 (i.e., its rising edge) and the "end" of either pulse 40 or pulse 42 (i.e., their respective falling edges), whichever occurs last. If the end of pulse 40 occurs last, or if no receiving devices respond, the bus speed is simply made equal to that proposed by the originating device 12; this is the "default" bus speed. However, if the end of pulse 42 occurs last, the bus speed is made equal to that proposed by receiving device 14. Pulse 42 ending last indicates that the receiving device communicates at a lower speed than that proposed by the originating device, and the speed negotiation scheme thus insures that the bus speed is low enough to accommodate the slower device.

The elapsed time described above is preferably measured by arranging the originating and receiving devices 12 and 14 so that the TOTAL BUS waveform 41 is toggled high at the start of pulse 40, and remains high until toggled low at the end of pulse 40 or pulse 42, whichever occurs last. The TOTAL BUS waveform 41 is conveyed to bus control circuits 18 and 22 via their respective receivers 16 and 20, informing both originating and receiving devices of the negotiated bus speed.

Arranging TOTAL BUS waveform 41 to toggle as described above is preferably accomplished with the use of bus driving transistors having differing drive currents. In message originating device 12, for example, each of transistors Q1, Q2 and Q3 preferably has a different drive current, with Q2's being the strongest ("strong"), followed by Q1's ("weak"), and Q3's being the weakest ("very weak"). Similarly, the transistors of message receiving device 14 are preferably arranged such that transistor Q4's drive current is about equal to Q1's, and Q5's is about equal to Q2's. Device 12 uses Q1 and Q2 to toggle the bus to a logic "1" and logic "0" state as needed to convey the data bits of a message, and device 14 uses Q4 and Q5 for this purpose. Making the drive currents of Q2 and Q5 stronger than those of Q1 and Q4 provides a bus contention scheme: if an originating device wants to prematurely abort a message transfer, it can do so by turning on the "strong" Q2 to pull the bus down to a logic "0", even if a receiving device is trying to drive a logic "1" with the "weak" Q4.

Transistor Q3 has a "very weak" drive current, so that it can be overcome by the "weak" drive current of logic "1"-creating transistors like Q4. As noted above, pulse 40 is toggled high by turning on transistor Q1. When pulse 40 falls, originating device transistor Q3 is turned on to pull the bus towards a logic "0" state with its very weak drive current. In response to pulse 40, receiving device transistor Q4 is turned on to apply logic pulse 42 to bus 10. In one embodiment, logic pulse 42 begins before logic pulse 40 falls; i.e., the two pulses are simultaneously "high", at least temporarily. Transistor Q4's "weak" drive current is made greater than Q3's "very weak" drive current to enable TOTAL BUS waveform 41 to accurately reflect the elapsed time described above. With Q4's drive current greater than Q3's, Q4 will dominate the bus; i.e., the bus will go to the logic state dictated by Q4. Thus, if pulse 42 is still at a logic "high" state when pulse 40 falls, Q4's "high" overcomes Q3's "low" and the bus remains at a logic high state.

When pulse 42 ends, receiving device 14 preferably "releases" the bus by putting its drivers into a high impedance mode, rather than actively pulling the bus low. By doing so, the earliest that the bus will be pulled down to a logic "low" (signaling the end of the elapsed time) is when Q3 turns on at the end of pulse 40. Thus, if pulse 42 ends (by entering the high impedance mode) before pulse 40, pulse 40's "high" state keeps the bus "high" until the end of pulse 40.

In FIG. 9a, the pulse 43 that appears on TOTAL BUS waveform 41 toggles "high" (44) at the start of pulse 40. Pulse 42 toggles "high" in response to pulse 40, but then releases the bus before the end of pulse 40 when receiving device 14 puts its drivers into a high impedance mode (45). TOTAL BUS waveform 41 then falls to a logic "low" (46) when pulse 40 ends and Q3 is turned on.

In FIG. 9b, a pulse 50 appears on TOTAL BUS waveform 41 as the bus toggles high (52) at the start of pulse 40. Receiving device 14 places a logic pulse 53 onto bus 10 in response. In this case, however, receiving device 14 communicates at a slower rate than did the receiving device in FIG. 9a, as indicated by pulse 53's wider pulse width. Pulse 40 falls prior to the end of pulse 53, but since Q4's drive current is greater than that of Q3, the TOTAL BUS waveform 41 remains high until pulse 53 ends (54). Pulse 53 ends when receiving device 14 releases the bus by placing its drivers into a high impedance mode (56), allowing Q3 to pull the bus "low". The TOTAL BUS pulse 50 thus represents the bus speed desired by the slower receiving device. The elapsed time between the start of pulse 40 and the end of pulse 53 is determined by simply measuring the pulse width of TOTAL BUS pulse 50; this pulse width is sensed by both the originating and receiving devices to establish the bus speed that will be used to convey a message between them. The pulse width of TOTAL BUS pulse 50 is identified as "TH" on FIGS. 9a and 9b.

The pulse width TH of the TOTAL BUS pulse that results from the above-described bus speed negotiation sequence can be translated into a bus speed in any number of ways. One convenient way of doing so is by defining the bus "bit time" as an integral multiple N of the measured pulse width TH. This is illustrated in FIGS. 9a and 9b, in which bit time $T_{BIT}$ is defined as equal to 4×TH (N=4). The multiplier N is constant, so that $T_{BIT}$ is easily derived regardless of the negotiated speed.

As described above, one embodiment of the system defines a logic "0" and a logic "1" using a combination of timing and DC voltage levels. Each logic state is a ratio of the amount of time that the bus is at a signal high (TH) (i.e., when the bus is at a DC voltage greater than a defined minimum), to the amount of time that the bus is at a signal low ("TL")(bus voltage less than a defined maximum) within the defined bit time $T_{BIT}$. For example, a logic "1" can be defined as having a ratio TH/TL=3; correspondingly, a "0" would have a ratio TH/TL=⅓. That is, if the bus is at a signal high for ¼ of a bit time $T_{BIT}$, and is low for ¾ of $T_{BIT}$, TH/TL=⅓, representing a logic "0".

The embodiment described above lends itself to deriving $T_{BIT}$ in this manner. The TOTAL BUS pulse width TH is simply multiplied by an integer N that implements a desired TH/TL ratio definition to arrive at the appropriate bit time $T_{BIT}$. For example, if the desired TH/TL ratio definitions are 3 and ⅓, and the desired maximum bus speed is 10 kHz, $T_{BIT}$ equals 1/10 kHz=100 microseconds. The message originating device should then produce a pulse 40 having a pulse width TH equal to 25 microseconds (i.e., $T_{BIT}$ is high for one 25 microsecond periods and low for three 25 microsecond periods) to establish 10 kHz as the default bus speed.

Figure 9C:
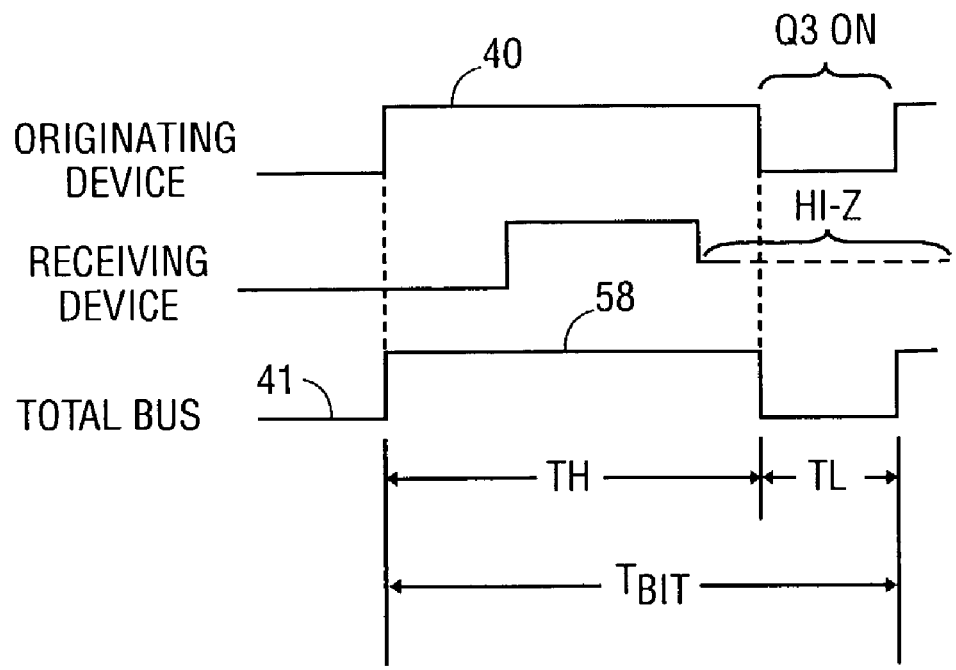
FIGS. 9c and 9d are timing diagrams for the data bus system of FIG. 8, illustrating alternative methods of calculating the bus' "bit time".

In the above examples, multiplying the pulse width of pulse 40 by an integer N to determine $T_{BIT}$ resulted in a TOTAL BUS pulse that met the TH/TL definition of a logic "0": high for a period TH and low for a period TL equal to $T_{BIT}$–TH. An alternative method of calculating the bit time $T_{BIT}$ is shown in the timing diagram of FIG. 9c. In FIG. 9c, the originating device 12 places logic pulse 40 onto bus 10, and the TOTAL BUS pulse 58 remains high until pulse 40 falls or all the receiving devices release the bus, whichever occurs last. Now, however, rather than having the resulting TOTAL BUS pulse define a logic "0", the TOTAL BUS pulse is used to define a logic "1". This is accomplished by dividing the pulse width of TOTAL BUS pulse 58 with an integer M, with M equal to the desired TH/TL ratio, and then multiplying the result by an integer N. $T_{BIT}$ is then defined as equal to TH/M×N, which reduces to TL×N.

For the example shown in FIG. 9c, assume the desired TH/TL is 3 (for a logic "1"). Then, M=TH/TL=3, and N must be 4 to provide the desired ratio. $T_{BIT}$ is thus equal to TH/3×4, or simply TL×4. An advantage of this approach is that, because $T_{BIT}$ now defines a logic "1" instead of a logic "0", the receivers 16 and 20 see a longer pulse when resolving the bus timing, which can lead to more timing accuracy. A disadvantage is that the receivers only have the short TL of a logic "1" to prepare for the upcoming message, as opposed to the longer TL available when the TOTAL BUS pulse defines a logic "0".

Figure 9D:
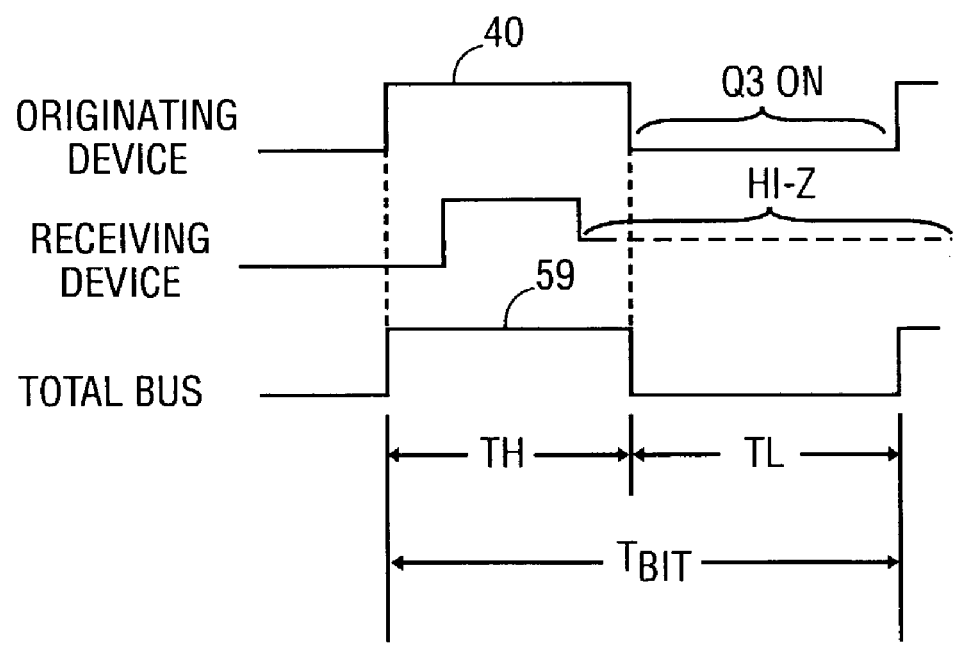

Another possible method of calculating the bus timing is illustrated in FIG. 9d. Here, rather than using the TOTAL BUS pulse to define a logic "1" or a logic "0", it is used only to establish the bit time. In FIG. 9d, for example, the TOTAL BUS pulse has a duty cycle of 50%, and $T_{BIT}$ is defined as equal to TH×2.

The bus speed negotiation scheme is not limited to these particular methods of deriving $T_{BIT}$, or to the use of TH/TL ratios to define logic states. This approach may be preferred, however, because of its convenience and ease of implementation. Nor is the bus speed negotiation scheme limited to the TH/TL ratios of 3 and ⅓ discussed above—these values may be preferred because they allow for a simple and efficient integer-math microcode implementation. Lower ratios (2 and ½) would provide greater bus bandwidth, while higher ratios would provide better noise immunity and robustness; lower or higher ratios are likely to require the use of less efficient microcoding, however.

Though bus negotiation pulses 40, 42 and 53 are shown toggling from "low" to "high" to "low", the bus negotiation scheme works equally well with pulses of the opposite polarity. However, in one embodiment in which the pulse width TH of the TOTAL BUS pulse establishes $T_{BIT}$, it is necessary that the originating and receiving device's respective bus negotiation pulses be of the same polarity, so that a slower receiving device can extend the pulse width of the resulting TOTAL BUS pulse. The polarity shown ("low" to "high" to "low" pulses) is desirable, because the bus is at a logic "0" when "idle", i.e., when between messages. The bus is presumed static when idle, and consumes no power if held at a logic "0" state, as opposed to the prior art buses noted above that hold the bus at a logic "1" when idle, which dissipate DC power when driving logic "0" states. The bus is preferably held at a logic "0" state when idle by turning on originating device transistor Q3, which reduces or eliminates noise glitches that could consume power or cause false starts.

FIG. 8 depicts a Class 1 data bus configuration, in which a single host (message originating device 12) communicates with a single client (message receiving device 14). Multiple clients can be also be accommodated in a Class 1 configuration: as shown in FIG. 8, a second client 60 is also coupled to bus 10, and additional clients can be similarly coupled. Only one client is made active at a time, however: client select lines 62 are coupled to respective clients and toggled as necessary to enable a particular client to communicate with the host. Because the present data bus system includes a bus speed negotiation scheme that establishes a bus speed prior to every message, clients having different communication speeds can each be coupled to bus 10, and the bus speed will be automatically adjusted as necessary to accommodate the different clients as they are enabled.

Figure 10:
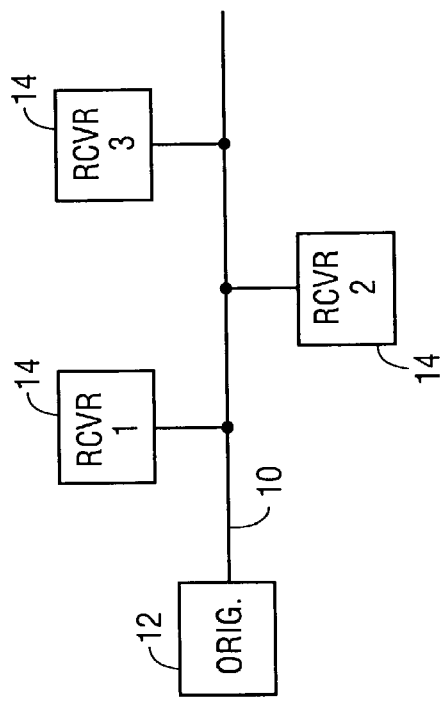
FIG. 10 is a block diagram of a Class 2 data bus system which includes a bus speed negotiation scheme.
Figure 11:
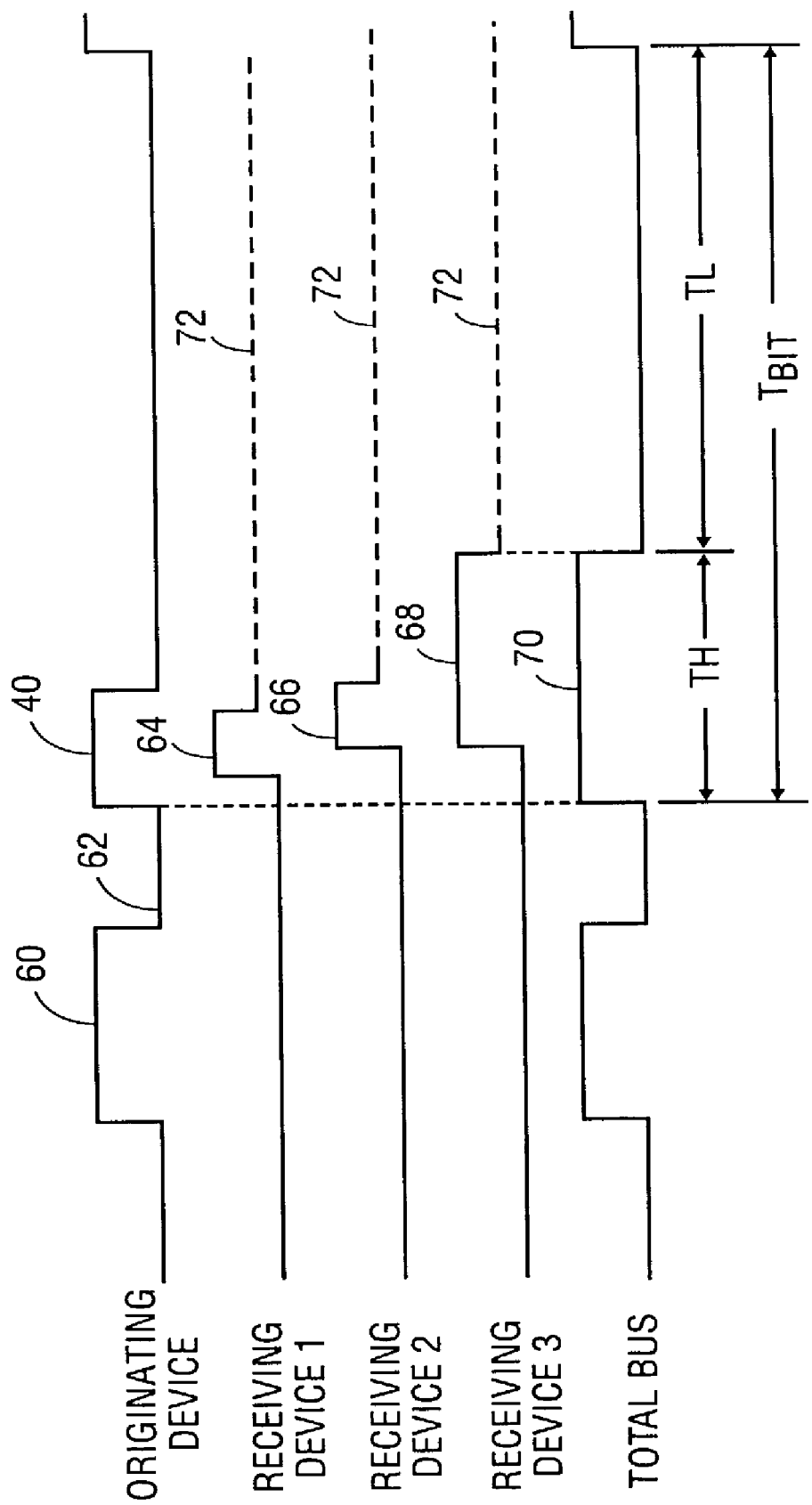
FIG. 11 is a timing diagram for the data bus system of FIG. 10, illustrating bus speed negotiation between four bus devices.

The bus speed negotiation scheme is equally applicable to a Class 2 bus configuration as shown in FIG. 10, which depicts a single message originating device 12 and three message receiving devices 14 (no "client select lines" are required for this Class 2 arrangement) identified as RCVR 1, RCVR 2 and RCVR 3. An exemplary timing diagram for the bus configuration of FIG. 10 is shown in FIG. 11. The timing diagram shown in FIG. 11 also includes a "wake-up" pulse that may be used with the present data bus system.

In one embodiment, a message originating device 12 generates a wake-up pulse after the bus 10 has been in an idle state. An exemplary wake-up pulse 60 is shown in FIG. 11. Referring to FIG. 11, the originating device drives the bus high for a pre-determined length of time to wake up the bus, and the wake-up pulse is reflected on the TOTAL BUS line. The originating device follows the wake-up pulse 60 by driving the bus low 62, preferably for a pre-determined length of time, before placing its bus negotiation pulse 40 onto bus 10. The start of pulse 40 is reflected in the TOTAL BUS waveform as the start of a TOTAL BUS pulse 70.

FIG. 11 also shows bus speed negotiation pulses 64, 66 and 68 as might be generated by receiving devices RCVR 1, RCVR 2 and RCVR 3, respectively, in response to pulse 40. RCVR 1 and RCVR 2 are "fast" devices, i.e., their respective responsive pulses 64 and 66 do not extend the pulse width of the TOTAL BUS pulse 70 started by pulse 40. RCVR 3, however, is a slow device: its responsive pulse 68 extends past the end of pulse 40, causing the pulse width of TOTAL BUS pulse 70 to become wider than that of pulse 40. TOTAL BUS pulse 70 finally falls when all three receiving devices have released the bus, by placing their drivers into a high impedance mode 72, for example. The pulse width of pulse 70 is thus indicative of the speed desired by the slowest device on the bus, and it is this speed that is established as the common bus speed for all devices on the bus.

Note that the common bus speed that is negotiated is based on the slowest device on the bus among those that responded. That is, if a receiving device has been disabled or disconnected from the bus, or does not respond for any reason, it will not be factored into the speed negotiation. In some systems, a message originating device such as a microprocessor may determine that only a small subset of the devices coupled to the bus need be active for an upcoming message. If the microprocessor disables the unneeded devices in some way—by opening a switch or toggling an enable line, for example—the bus negotiation scheme per the present invention negotiates a proper bus speed from among the devices that remain active. The unprecedented flexibility afforded by this approach allows a one-wire bus system's bus speed to automatically change to accommodate every change in system configuration, enabling each bus communication to proceed at an optimum rate.

Figure 12:
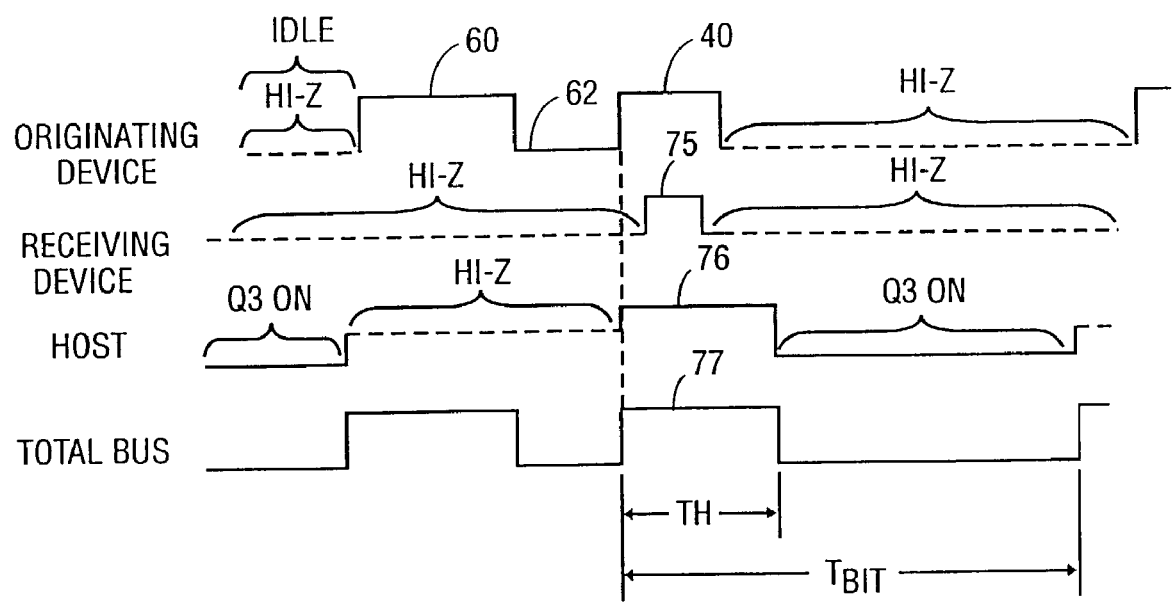
FIG. 12 is a timing diagram illustrating bus speed negotiation between bus devices arranged in a Class 3 bus configuration.

In a Class 1 or Class 2 bus configuration, there is typically only one device—the "master"—which can originate messages. The present data bus system can also be employed in a Class 3 data bus system, in which more than one bus device is allowed to originate messages. The bus negotiation scheme used with a Class 3 system is nearly identical to that described above; a timing diagram illustrating this is shown in FIG. 12. Here, the "master" device is equivalent to originating device 12, with a transistor Q3 pulling down on the bus with a very weak drive current when the bus is idle.

Initially, the bus is idle, with all bus devices other than the host in a high impedance mode. A device other than the host (master) wishes to originate a message and places pulse 60 onto the bus. In response, Q3 is preferably turned off and the host presents a high impedance to the bus, though the very weak Q3 could remain on if power consumption is not a concern. Pulse 60 ends and the originating device holds the bus low for a period 62. The originating device then places bus speed negotiation pulse 40 onto the bus. The other bus devices respond with their respective bus speed negotiation pulses (75 and 76) in the same manner as before. At the end of their respective pulses 40, 75 and 76, the host turns Q3 back on, and the other devices go into high impedance mode; in this way, the TOTAL BUS pulse 77 goes high at the start of the first bus speed negotiation pulse and falls with the falling edge of pulse 40 or the last responsive pulse, whichever occurs last. The pulse width TH of TOTAL BUS pulse 77 may be used to establish the bit time $T_{BIT}$ as discussed above.

Figure 13:
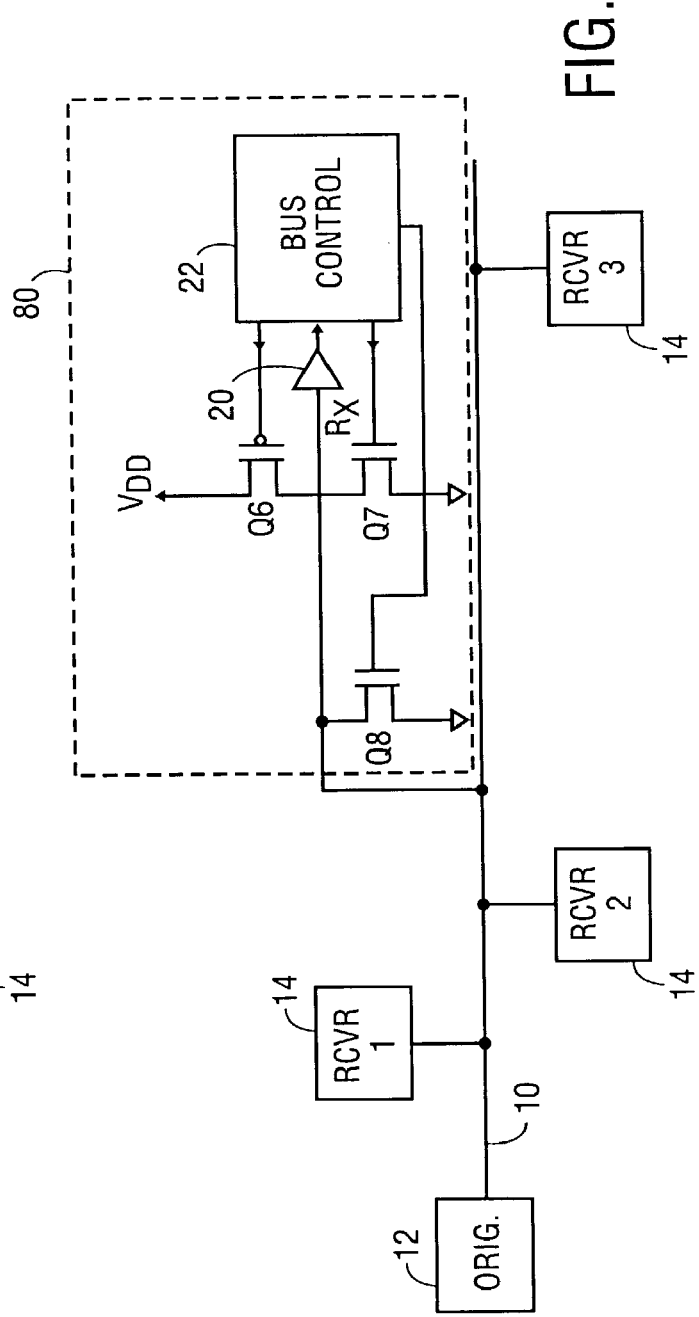
FIG. 13 is a combination block and schematic diagram of a data bus system which includes multiple bus hosts.

A data bus system which includes more than one master device is shown in FIG. 13. This configuration includes the message originating device 12 and message receiving devices 14 of FIG. 11, and also includes an additional device 80 similar to message originating device 12, with transistors Q6, Q7 and Q8 being analogous to Q1, Q2 and Q3, respectively, of device 12. Due to the presence of very weak drive transistors Q3 and Q8 in devices 12 and 80, either can operate as the master. However, to avoid bus contention problems, only one of the multiple masters should be active at any one time. This configuration would be useful if one or more of the multiple masters were not present for some reason—by being disabled or physically disconnected, for example—since the bus can still operate due to the presence of the remaining active master.

For the data bus system to operate properly when using transistors having different drive currents to establish bus speed, it is only necessary that the drive current of the receiving device transistor (e.g., Q4 in FIG. 8) be greater than that of the originating device transistor (e.g., Q3 in FIG. 8) which it must overcome to extend the TOTAL BUS pulse width. The bus system's noise immunity is affected by the difference in the drive currents, with a greater difference providing a greater noise immunity. Differing transistor drive currents are typically provided by fabricating differently-sized transistors.

Referring back to FIG. 8, an arrangement which provides a good balance between noise immunity and transistor sizing differences requires transistors Q2 and Q5 to have about 10 times the drive current of Q1 and Q4, which in turn have about 10 times the drive current of Q3. For example, transistors Q2 and Q5 have drive currents of about 1 ma, creating what is referred to as a "strong low" when on, Q1 and Q4 have drive currents of about 100 microamperes each (creating a "weak high" when turned on), and Q3 has a drive current of about 10 microamperes (creating a "very weak low" when on). These drive current differences result in a logic "1" being defined as when the bus 10 is driven to at least 2.4 volts, and a logic "0" being defined as when the bus is pulled down to 0.6 volts or less. The receivers 16 and 20 then define a "1" as +2 volts and a "0" as +1 volt, providing a noise margin of about 1 volt. Other factors to be considered when defining these logic states include the amount of IC area that can be allotted to the driving transistors (because their respective drive currents are directly related to their physical size), and the capacitance of the bus.

Though only field-effect transistors (FETs) have been depicted in the implementation of the data bus system, the invention is not limited to the use of FETs. Other types of active devices capable of driving a bus wire "high" or pulling it "low", such as bipolar transistors, will work equally well.

Figure 5:
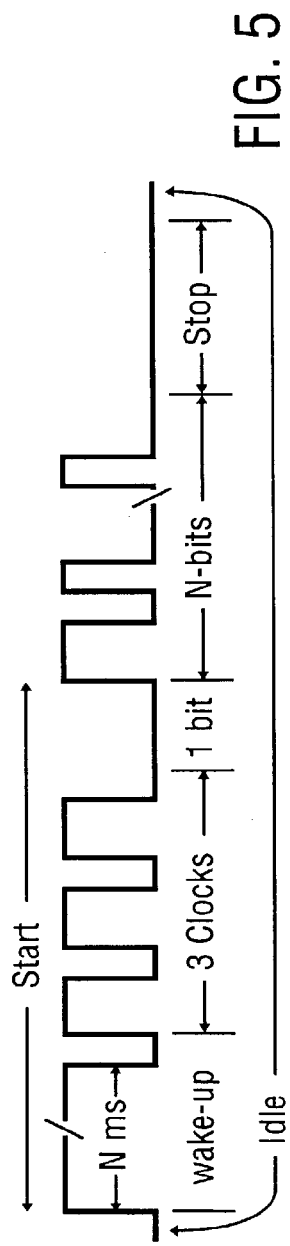
FIG. 5 illustrates the start period timing.

In an alternative embodiment, the start period conveys bus timing information to all slaves on the bus. This technique is particularly useful for a fast bus with a narrow speed range. All other protocol issues remain unchanged, such as, for example, stop period and message length. Specifically, after the wake-up pulse, the timing information is next conveyed by a predetermined number (e.g., 3) clocks where each clock is one-bit wide. FIG. 5 shows such timing information using three synchronization clocks (logic '1'). A microcontroller implementation can be done with one or more pulses. One-bit time low is inserted after the three synchronization clocks to discriminate between the clock synchronization and the beginning of the message bits.

The slave is capable of interrogating the pulses and extracting the clock timing for this message at the maximum bus speed. In one embodiment, no pulse aliasing is permitted. The message proceeds at the defined bit rate in the start period. By sending timing information with each message, the timing reference in the slave is calibrated to the master's bus speed for each message. The slave absolute time base accuracy need not be great because the time base need only remain stable for the length of a message. As long as the time base does not drift during an entire bus transaction, the absolute time base accuracy is not important. Because the absolute time base accuracy is not important, slave devices may be clocked by cheaper clock sources, such as, for example, an RC oscillator, which may drift over time, but maintains synchronization for a long enough period of time.

The bus speed negotiation schemes described herein are not limited to a one-wire bus. It is also applicable to multi-wire buses, but since the bus negotiation scheme requires just one wire, its benefits are best realized with a one-wire bus.

Applications

The present invention may also be useful for such portable devices such as cell phones and notebook computers, and/or their confluence.

One application of the single line communication is for use with slave devices to power their interface while acting as the physical layer for their communication such as hand held/WinCE device or cell phone batteries. For example, the battery may have three different activity states. A first state may be a low power state in which it only discharges power by itself. In a higher powered state, the battery may monitor its temperature and its amount of discharge and determine whether or not to update its capacity. In the highest powered state, the battery monitors its state more frequently as a higher rate of power discharge occurs and communicates with the host. By allowing its interface circuitry to be powered down to lower power levels, except in the highest power state, a more power efficient battery may be obtained.

An application of the single wire bus to power devices is with devices that do not require power to perform their functions. Such a device may only need power for certain activities to occur, such as programming. For example, a device such as a variable resistor for setting a contrast control doesn't require power except for programming. This type of device could be coupled to the single wire bus to receive the power necessary for its programming.

Thus, the single wire bus can allow devices with interfaces to receive power from the bus and "wake up" in response to another device driving the bus.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a single wire bus for delivering data and power to devices has been described.

We claim:

1. A data bus system arranged to convey a message between a message originating device and a message receiving device at a bus speed negotiated between them, comprising:
   a data bus for conveying messages between devices connected to said bus,
   a message originating device connected to said data bus and arranged to place a first bus speed negotiation pulse onto said bus which toggles from a first logic state to a second logic state, thereby toggling said bus from said first logic state to said second logic state, prior to toggling to a third logic state and thereby ending said first pulse, and
   a message receiving device connected to said data bus and arranged to place a second bus speed negotiation pulse onto said bus in response to said first pulse,
   said data bus system arranged such that the elapsed time between the start of said first pulse and the end of said first or second pulse, whichever occurs last, establishes a negotiated bus speed at which a message is to be conveyed between said originating device and said receiving device,
   wherein a message conveyed on said bus following said second pulse is comprised of data bits and said data bus system is arranged such that each of said data bits occupies a "bit time" which is equal to said elapsed time multiplied by an integer N.

2. The data bus system of claim 1, wherein said integer N is three.

3. The data bus system of claim 1, wherein said first pulse when in said third logic state has a known drive current and said second pulse toggles between said first logic state and said second logic state in response to said first pulse, said second pulse while in said second logic state having a drive current that is greater than said drive current of said first pulse's third logic state such that said second pulse while in said second logic state dominates said bus when said first pulse is in said third logic state.

4. The data bus system of claim 3, wherein the pulse width of said first pulse establishes a default bus speed, said bus speed being varied from said default speed when said second pulse ends after said first pulse ends and thereby extends the time over which said bus is at said second logic state.

5. The data bus system of claim 1, wherein said message originating device and said message receiving device each include a receiver connected to said bus for ascertaining said elapsed time.

6. The data bus system of claim 1, wherein the pulse widths of said first and second pulses are representative of the bus speeds at which said message originating device and said message receiving device propose to communicate, respectively, said negotiated bus speed being the slower of the two proposed bus speeds.

7. A data bus system arranged to convey a message between a message originating device and a message receiving device at a bus speed negotiated between them, comprising:
- a data bus for conveying messages between devices connected to said bus,
- a message originating device connected to said data bus and arranged to place a first bus speed negotiation pulse onto said bus which toggles from a first logic state to a second logic state, thereby toggling said bus from said first logic state to said second logic state, prior to toggling to a third logic state and thereby ending said first pulse, and
- a message receiving device connected to said data bus and arranged to place a second bus speed negotiation pulse onto said bus in response to said first pulse,
- said data bus system arranged such that the elapsed time between the start of said first pulse and the end of said first or second pulse, whichever occurs last, establishes a negotiated bus speed at which a message is to be conveyed between said originating device and said receiving device,
- wherein said first pulse when in said third logic state has a known drive current and said second pulse toggles between said first logic state and said second logic state in response to said first pulse, said second pulse while in said second logic state having a drive current that is greater than said drive current of said first pulse's third logic state such that said second pulse while in said second logic state dominates said bus when said first pulse is in said third logic state, and
- wherein said message receiving device presents a high impedance to said bus at the end of said second pulse such that the bus assumes the logic state of said first pulse when said second pulse ends.

8. A data bus system arranged to convey a message between a message originating device and a message receiving device at a bus speed negotiated between them, comprising:
- a data bus for conveying messages between devices connected to said bus,
- a message originating device connected to said data bus and arranged to place a first bus speed negotiation pulse onto said bus which toggles from a first logic state to a second logic state, thereby toggling said bus from said first logic state to said second logic state, prior to toggling to a third logic state and thereby ending said first pulse, and
- a message receiving device connected to said data bus and arranged to place a second bus speed negotiation pulse onto said bus in response to said first pulse,
- said data bus system arranged such that the elapsed time between the start of said first pulse and the end of said first or second pulse, whichever occurs last, establishes a negotiated bus speed at which a message is to be conveyed between said originating device and said receiving device,
- wherein said first pulse when in said third logic state has a known drive current and said second pulse toggles between said first logic state and said second logic state in response to said first pulse, said second pulse while in said second logic state having a drive current that is greater than said drive current of said first pulse's third logic state such that said second pulse while in said second logic state dominates said bus when said first pulse is in said third logic state,
- wherein the pulse width of said first pulse establishes a default bus speed, said bus speed being varied from said default speed when said second pulse ends after said first pulse ends and thereby extends the time over which said bus is at said second logic state, and
- wherein a message conveyed on said bus is comprised of data bits and said data bus system is arranged such that each of said data bits occupies a "bit time" $T_{BIT}$ which is equal to the time TH over which said bus is at said second logic state multiplied by an integer N, said data bus system defining a logic "0" as a signal that is at a logic "high" state for time TH and which falls to a logic "low" state for a time TL equal to $T_{BIT}$–TH.

9. A data bus system arranged to convey a message between a message originating device and a message receiving device at a bus speed negotiated between them, comprising:
- a data bus for conveying messages between devices connected to said bus,
- a message originating device connected to said data bus and arranged to place a first bus speed negotiation pulse onto said bus which toggles from a first logic state to a second logic state, thereby toggling said bus from said first logic state to said second logic state, prior to toggling to a third logic state and thereby ending said first pulse, and
- a message receiving device connected to said data bus and arranged to place a second bus speed negotiation pulse onto said bus in response to said first pulse,
- said data bus system arranged such that the elapsed time between the start of said first pulse and the end of said first or second pulse, whichever occurs last, establishes a negotiated bus speed at which a message is to be conveyed between said originating device and said receiving device,
- wherein said first pulse when in said third logic state has a known drive current and said second pulse toggles between said first logic state and said second logic state in response to said first pulse, said second pulse while in said second logic state having a drive current that is greater than said drive current of said first pulse's third logic state such that said second pulse while in said second logic state dominates said bus when said first pulse is in said third logic state,
- wherein the pulse width of said first pulse establishes a default bus speed, said bus speed being varied from said default speed when said second pulse ends after said first pulse ends and thereby extends the time over which said bus is at said second logic state, and
- wherein a message conveyed on said bus is comprised of data bits and said data bus system is arranged such that each of said data bits occupies a "bit time" $T_{BIT}$ which is equal to the time TH over which said bus wire is at said second logic state divided by an integer M and multiplied by an integer N, said data bus system defining a logic "1" as a signal that is at a logic "high" state for time TH and which falls to a logic "low" state for a time TL equal to $T_{BIT}$–TH, said integer M equal to TH/TL.

10. A data bus system arranged to convey messages between a message originating device and a plurality of message receiving devices at a negotiated bus speed, comprising:
- a data bus for conveying messages between devices connected to said bus, a message originating device connected to said data bus and arranged to place a first bus speed negotiation pulse onto said bus wire which toggles from a first logic state to a second logic state, thereby toggling said bus from said first logic state to said second logic state, prior to toggling to a third logic state and thereby ending said first pulse, and a plurality of message receiving devices connected to said data bus, each of said receiving devices arranged to place a respective responsive bus speed negotiation pulse onto said bus in response to said first pulse while said bus is in said second logic state due to said first pulse, said data bus system arranged such that the elapsed time between the start of said first pulse and the end of said first pulse or any of said responsive pulses, whichever occurs last, establishes a negotiated bus speed at which a message is to be conveyed between said originating device and any of said receiving devices, wherein each of said message receiving devices presents a high impedance to said bus at the end of its respective responsive pulse such that said bus assumes the logic state of said first pulse when each of said responsive pulses has ended.

11. The data bus system of claim 10, wherein the pulse width of said first pulse represents the bus speed at which said message originating device proposes to communicate and the respective pulse widths of said responsive pulses represent the bus speeds at which their respective message receiving devices propose to communicate, said negotiated bus speed being the slowest of the proposed bus speeds.

12. The data bus system of claim 10, wherein said first pulse when in said third logic state has a known drive current and each of said responsive pulses toggles between said first logic state and said second logic state in response to said first pulse, said responsive pulses while in said second logic state each having a drive current greater than said drive current of said first pulse's third logic state such that said responsive pulses while in said second logic state dominate said bus when said first pulse is in said third logic state.

13. The data bus system of claim 10, wherein said message originating device and each of said message receiving devices include respective receivers connected to said bus for ascertaining said elapsed time.

14. The data bus system of claim 10, wherein said first logic state and said third logic state are logic "zero" states and said second logic state is a logic "one" state, said message originating device comprising first, second and third transistors which drive said bus to said first, second and third logic states, respectively, the drive current of said third transistor being less than the respective drive currents of said first and second transistors.

15. The data bus system of claim 10, wherein a plurality of said message originating devices are connected to said data bus, said data bus system arranged to permit any of said message originating devices to place said first bus speed negotiation pulse onto said bus to negotiate bus speed between the message originating device which placed said first bus speed negotiation pulse onto said bus and the other devices on said bus.

16. The data bus system of claim 14, wherein said data bus system includes a plurality of said message originating devices, each of which comprises first, second and third transistors which drive said bus to said first, second, and third logic states, respectively, said message originating devices' third transistors having respective drive currents, each of which is lower than the respective drive currents of any of said first and second transistors, said data bus system arranged such that only on of said message originating devices is permitted to operate on the bus at any one time.

17. A method of negotiating bus speed between devices connected to a data bus, comprising:

placing a first bus speed negotiation pulse onto a data bus, placing a second bus speed negotiation pulse onto said data bus in response to said first pulse, and measuring the elapsed time between the start of said first pulse and the end of said first pulse or said second pulse, whichever occurs last, said elapsed time defining the bus speed at which a message will be conveyed between devices connected to said bus, wherein the respective pulse widths of said first and second pulses are representative of the bus speeds at which a message originating device and a message receiving device, both of which are connected to said bus, propose to communicate over said bus, said defined bus speed being the slower of the two proposed bus speeds, and wherein said message receiving device presents a high impedance to said bus at the end of said second pulse such that the bus assumes the logic state of said first pulse after said second pulse ends.

18. The method of claim 17, wherein the pulse width of said first pulse establishes a default bus speed, said bus speed varied from said default speed when said second pulse ends after said first pulse ends.

19. The method of claim 17, wherein a message originating device places said first pulse onto said bus and a plurality of message receiving devices place respective second pulses onto said bus, the elapsed time between the start of said first pulse and the end of said first pulse or any of said second pulses, whichever comes last, defining the bus speed for a message to be conveyed between said originating device and any of said receiving devices.

20. A method of negotiating bus speed between a message originating device and message receiving devices connected to a data bus, comprising:

placing, by a message originating device connected to a data bus, a first bus speed negotiation pulse onto said data bus which toggles from a first logic state to a second logic state to a third logic state, said originating device applying a known drive current to said bus wire when in said third logic state, placing, by each of a plurality of message receiving devices connected to said data bus, respective responsive bus negotiation pulses of the same polarity as said first pulse onto said data bus in response to said first pulse while said first pulse is in said second logic state, said responsive pulses having a greater drive current than said first pulse's drive current when in said third logic state, and measuring the time over which said bus is at said second logic state, said time defining the speed at which a message is to be conveyed between said originating device and any of said receiving devices over said data bus, wherein said message receiving devices each present a high impedance to said bus at the end of their respective responsive pulses such that said bus assumes the logic state of said first pulse after each of said responsive pulses has ended.

21. The method of claim 20, wherein a message conveyed on said bus is comprised of data bits and each of said data bits occupies a "bit time" which is equal to said time over which said bus wire is at said second logic state multiplied by an integer N.

22. The method of claim 20, wherein a message conveyed on said bus is comprised of data bits, each of said data bits occupying a "bit time" $T_{BIT}$ which is equal to the time TH over which said bus is at said second logic state multiplied by an integer N, a logic "0" on said bus being defined as a signal that is at a logic "high" state for time TH and which falls to a logic "low" state for a time TL equal to $T_{BIT}$–TH.

23. The method of claim 20, wherein a message conveyed on said bus is comprised of data bits, each of said data bits occupying a "bit time" $T_{BIT}$ which is equal to the time TH over which said bus is at said second logic state divided by an integer M and multiplied by an integer N, a logic "1" on said bus being defined as a signal that is at a logic "high" state for time TH and which falls to a logic "low" state for a time TL equal to $T_{BIT}$–TH, said integer M equal to TH/TL.

* * * * *

UNITED STATES PATENT AND TRADEMARK OFFICE
CERTIFICATE OF CORRECTION

PATENT NO. : 7,143,215 B2  
APPLICATION NO. : 10/266500  
DATED : November 28, 2006  
INVENTOR(S) : Dunstan et al.

It is certified that error appears in the above-identified patent and that said Letters Patent is hereby corrected as shown below:

In column 20, at line 2, delete "on" and insert --one--.

Signed and Sealed this

Thirtieth Day of October, 2007

JON W. DUDAS  
*Director of the United States Patent and Trademark Office*